United States Patent [19]

Järvenkylä et al.

[11] Patent Number: 5,759,461
[45] Date of Patent: Jun. 2, 1998

[54] METHOD OF FORMING A MULTI-LAYER PLASTIC PIPE FOR CONDUCTING FLUIDS

[75] Inventors: Jyri Järvenkylä, Hollola, Finland; Mikael Andersson, Göteborg, Sweden; Anders Vestergaard, Hadsund, Denmark

[73] Assignee: Uponor Innovation AB, Fristad, Sweden

[21] Appl. No.: 172,535

[22] Filed: Dec. 23, 1993

[30] Foreign Application Priority Data

Dec. 28, 1992 [FI] Finland .................................. 925897

[51] Int. Cl.⁶ .................................................. B29C 47/06
[52] U.S. Cl. .......................... 264/45.9; 156/244.13; 264/508; 264/514; 264/171.26; 264/171.28; 264/209.3; 264/300; 264/173.18; 425/396; 425/462
[58] Field of Search ................... 264/508, 209.3–209.4, 264/171.26–171.28, 45.9, 173.18, 514, 300; 156/244.13; 425/133.1, 462, 113, 393, 396, 336

[56] References Cited

U.S. PATENT DOCUMENTS

| | | | |
|---|---|---|---|
| 3,649,730 | 3/1972 | Benteler | 264/47 |
| 3,740,958 | 6/1973 | Cadwell | 156/244.13 |
| 3,998,579 | 12/1976 | Nordstrom | 425/393 |
| 4,144,111 | 3/1979 | Schaerer | 264/171.28 |
| 4,261,777 | 4/1981 | Vetter et al. | 156/244.13 |
| 4,299,256 | 11/1981 | Bacehowski . | |
| 4,728,478 | 3/1988 | Sacks et al. | 264/108 |
| 4,790,975 | 12/1988 | Jarvenkyla et al. | 264/508 |
| 4,836,968 | 6/1989 | Cakmakei | 264/209.3 |
| 4,906,313 | 3/1990 | Hill . | |
| 4,927,184 | 5/1990 | Bourjot et al. | 156/244.13 |
| 4,932,746 | 6/1990 | Calzolari | 350/961.23 |

FOREIGN PATENT DOCUMENTS

| | | | |
|---|---|---|---|
| 18364 | 4/1978 | Australia . | |
| 6473690 | 1/1991 | Australia . | |
| 5823090 | 4/1991 | Australia . | |
| 6568290 | 6/1992 | Australia . | |
| 351324 | 7/1979 | Austria . | |
| 0365974 | 2/1982 | Austria . | |
| 3851043 | 2/1990 | Austria . | |
| 0010835 | 5/1980 | European Pat. Off. . | |
| 0018048 | 10/1980 | European Pat. Off. | 156/244.13 |
| 0024220 | 2/1981 | European Pat. Off. . | |
| 0159307 | 3/1986 | European Pat. Off. . | |
| 213674 | 3/1987 | European Pat. Off. . | |
| 0301878 | 2/1989 | European Pat. Off. . | |
| 0474583 | 3/1992 | European Pat. Off. . | |
| 2031959 | 1/1972 | Germany . | |
| 3016134 | 10/1981 | Germany . | |
| 3638136 | 5/1988 | Germany . | |
| 324392 | 2/1991 | Japan . | |
| 7316972 | 6/1974 | Netherlands | 264/508 |
| 636445 | 10/1976 | U.S.S.R. . | |
| 2111164 | 6/1983 | United Kingdom . | |
| 2144413 | 3/1986 | United Kingdom . | |
| 2226788 | 7/1990 | United Kingdom . | |
| 9008915 | 8/1990 | WIPO . | |
| 9100466 | 1/1991 | WIPO . | |

OTHER PUBLICATIONS

Abstract JP 3–24392 of Feb. 1, 1991.

English Transaction of JP 3–24392 of Feb. 1, 1991.

*Primary Examiner*—Jeffery R. Thurlow
*Attorney, Agent, or Firm*—Ladas & Parry

[57] ABSTRACT

A method of forming a two-layer plastic pipe (4;8) to be laid in the ground for conducting material therethrough forms a core pipe (2) consisting essentially of a first plastic material and forms a detachable outer hose (3;7) of a second plastic material around said core pipe (2) by a suitable coating method, including in said second plastic material an amount of additives effective to protect said core pipe with said outer hose from stresses and loads of laying said core pipe and outer hose and usage thereof in ground.

16 Claims, 2 Drawing Sheets

METHOD OF FORMING A MULTI-LAYER PLASTIC PIPE FOR CONDUCTING FLUIDS

BACKGROUND OF THE INVENTION

The invention relates to a method of forming a multi-layer plastic pipe for conducting fluids. The invention also relates to a multi-layer plastic pipe formed by the method, as well as to a method of connecting a multi-layer plastic pipe.

During handling, laying and joining of plastic pipes, the pipe surface is exposed to damage. For example, modern laying methods for plastic pipes are based on drilling a tunnel in the ground for the pipe, the pipe being then passed through the tunnel e.g. to an excavation where the next pipe sections are seamed.

Naturally, a pipe is hereby subjected e.g. to different bending and tensile forces. This is disadvantageous since bending, stretching and scratching of a pipe deteriorate its mechanical strength, thereby reducing its life. In addition, the lifetime of a pipe may be reduced by environmental conditions, such as diffusible materials.

It is previously known to coat plastic pipes with different protective layers e.g. for transportation and storage. However, the known protective layers are not load carrying structures, neither in respect of mechanical nor chemical loads.

SUMMARY OF THE INVENTION

The object of the present invention is to eliminate the above disadvantages by providing a method for forming a multi-layer plastic pipe. It is also an object of the present invention to provide such a pipe. Furthermore, it is an object of the present invention to provide a method of connecting a multi-layer plastic pipe. A pipe according to the present invention is is easy to lay and, in addition, inexpensive in view of its properties.

The method of forming a multi-layer plastic pipe for conducting fluids, the multi-layer plastic pipe formed by the method, and the method of connecting a multi-layer plastic pipe, are characterized by what is stated in the appending claims.

A pipe according to the present invention, which is provided with a protective layer, is stiffer and stronger than the corresponding pipes in general and, in addition, it is fully protected against scratching. The invention enables e.g. the use of standard pipes in conditions to which they are not applicable as such, e.g. in laying procedures that cause vast tensile stresses or in laying in the ground pipes impervious only to internal pressure.

When a single-layer pipe is formed, often a bigger or smaller amount of fillers, depending on the use of the pipe, must be mixed with the plastic material Fillers usually have a disadvantageous effect on the mechanical properties and weldability of the pipe. In a two-layer pipe according to the present invention, the properties of the core pipe or conducting pipe are optimised for the conducting of fluids, and the outer layer is designed to resist any external conditions and stress. This results in a pipe arrangement where the structure has not been compromised with, thus replacing expensive special pipes with standard pipes coated with an inexpensive outer layer tailored for the laying conditions.

Welding is also easier and safer with the pipe formed by the method of the invention since e.g. seaming of pies is not possible without that the outer layer is first removed from the area to be seamed, i.e. the pipe ends must always be clean when they are seamed, whether by welding or by any other method. The inventive concept ensures that welding is always successful and that the welding machines operate as intended.

BRIEF DESCRIPTION OF THE DRAWINGS

In the following the invention is described in greater detail by means of examples and with reference to the attached drawings, wherein.

DETAILED DESCRIPTION OF PREFERRED EMBODIMENTS

Figure 1:
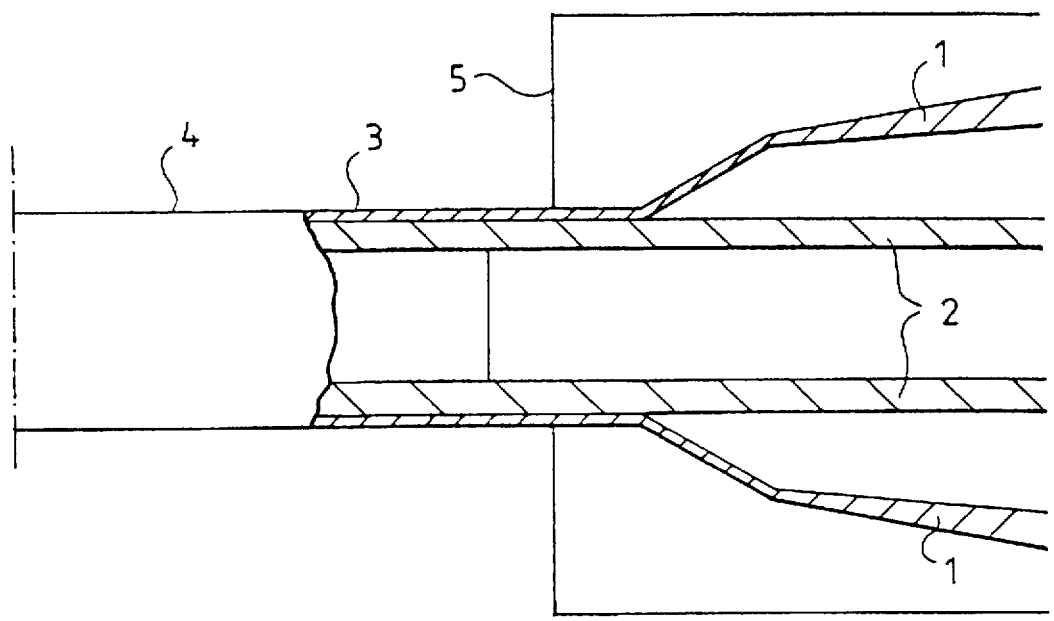
FIG. 1 depicts a forming method and a pipe according to one embodiment of the invention.

FIG. 1 depicts coating of a plastic pipe 2 according to the invention with a surface layer by coextrusion. The surface layer is formed from melt plastic 1 to provide a protective layer 3 around a pipe 2 of a specified size. Coextrusion dies 5, e.g. so-called crosshead dies, are known to one skilled in the art, and coextrusion as such is not explained herein in greater detail.

The protective outer layer according to the invention is advantageously made easily detachable from the core pipe by simple means, either wholly or only at the joint surfaces, such as the pipe ends. In this way, the surfaces remain in as good a condition as possible for the seaming carried out by e.g. welding. According to a preferred embodiment of the invention, these objectives are achieved by making the surface of the outer layer moderately hard, whereby it has a low adhesion, and to make the structure of the layer moderately stiff, whereby the outer layer can be detached from the pipe e.g. by knocking. For example, chalk and talc are suitable fillers in respect of achieving this effect.

In a pipe 4 according to the invention the plastics raw material used for the protective outer layer 3 may be e.g. linear LDPE or even recycled plastics waste. The advantage of the linear LDPE is its high scratching and puncture resistance in view of its price, whereas the advantage of the plastics waste is its low price. When the material is selected, it is advisable to take into account that if the outer layer is made from plastics differing from the material of the core pipe with respect to the chemical structure, the adhesion between the pipe and the protective outer layer is probably lower (they can be detached more easily) than if exactly the same material is used.

Figure 2:
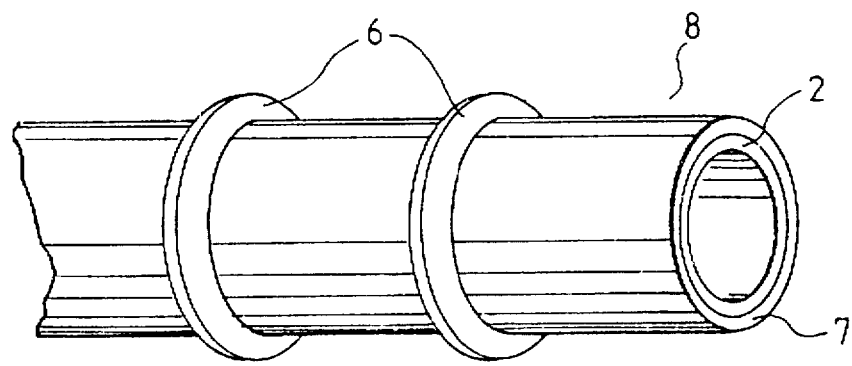
FIG. 2 depicts another embodiment of the pipe of the invention.

According to another preferred embodiment of the invention, the material of the outer layer 3 has at least the same strength and/or stiffness as the material of the core pipe 2. Thus the protective outer layer can be a load-carrying component without having high requirements set for the raw material (the price must be as low as possible). Thus, cheap reinforcing and/or stiffening fillers or fibres may be mixed to the material of the protective layer. Alternatively, an outer layer 7 may be stiffened in accordance with FIG. 2, by ribbing or corrugations 6, to make the pipe 8 sufficiently stiff. The ribbed outer layer 7 may be formed e.g. in a grilled pipe machine or corrugating device.

The protective outer layer can also be stiffened by foaming in a forming step, whereby the pipe also acquires a considerable thermal insulation capacity.

Furthermore, the material of the outer layer 3 may advantageously be crosslinked in order to improve the stiffness and strength and the resistance of the outer layer of the pipe. In pipes reinforced in this manner, the core pipe may be a thin-walled pipe or even a hose, which is capable of resisting only internal pressure caused by the fluid to be conducted, but which would be flattened by earth pressure when laid in the ground if not properly supported. The strength properties of the outer layer may also be made different in the radial and axial directions of the pipe.

In a further embodiment of the invention, slate-like mica is mixed with the material of the outer layer to improve the barrier properties of the pipe. For example, benzene compounds penetrate fairly easily through a wall of a conventional tap water pipe made from polyethene. When a mixture having good resistance (barrier properties) to the penetration of the above substances is selected as the material of the outer layer, it is easy to tailor a tap water pipe for a specified aggressive chemical environment.

In yet another embodiment of the invention barium sulfate is mixed with the material of the outer layer to make the specific gravity of the pipe higher than that of water. Barium sulfate ($BaSO_4$) has a high density, wherefore the overall density of e.g. a polyethene pipe can be made higher than that of water. This feature makes the pipe suitable for arrangements where the pipe is laid in water.

In an additional embodiment of the invention, easily magnetizable material or electrically conductive particles are mixed with the material of the outer layer to render the pipe detectable by a magnetic field. Examples of magnetizable materials are iron oxide and barium ferrite. In this embodiment the outer layer makes it possible to render the pipe laid in the ground easily detectable by electromagnetic means. Mixed in a single-layer pipe, fillers of this kind would reduce the strength of the pipe.

In still a further embodiment of the invention, electrically conductive material is mixed with the material of the outer layer to render the pipe electrically conductive. In an electrically conductive outer layer, cracks occurring in the pipe line can be detected e.g. by a cable fault finder. In addition, an electrically conductive outer casing eliminates risks caused by induced electricity e.g. in an explosive environment. The electrically conductive material may also be e.g. a copper wire embedded in the outer layer.

In a still further embodiment of the invention all the necessary identifying dyes and UV stabilizing agents are mixed with the material of the outer layer. Thereby these pipe material-weakening agents need not be mixed to the material of the actual conducting or core pipe 2.

During the formation of the pipe it is possible to introduce an adhesion inhibiting or enhancing agent, depending on the use and the materials selected, between the outer layer and the core pipe. In a preferred embodiment of the invention, a release agent, such as low molecular weight polyethylene wax, is mixed with the material of the outer layer to facilitate the detachment of the outer layer from the core pipe 2. In another embodiment, the core pipe is, prior to forming of the outer layer, dipped in a bath containing liquid polymers which act as an adhesion inhibiting layer between the core pipe and the outer layer.

The outer layer can also be designed to be detachable from the core pipe upon applying heat to the part of the outer layer to be removed.

If the core pipe is made e.g. from polyethene and the outer layer from polypropene mixed with wax, the outer layer is easy to detach from the core pipe. This is particularly advantageous when the core pipe needs to be easily replaceable (relining): the core pipe is replaced by simply pulling it out from the outer layer and inserting a new core pipe in the layer formed by the outer layer.

It is also possible to introduce welding and/or crosslinking enhancing agents between the outer layer and the core pipe. Suitable welding enhancing agents include e.g. dicumylperoxide. Crosslinking agents complement the crosslinking reaction of the pipe material in the joint surface and provide lubrication, which is advantageous in that it reduces the adhesion of the protective layer. The crosslinking agents may be the same generally known radicals that are used in the matrix material of the pipe.

In a further embodiment of the invention, a thin aluminum layer is provided between the outer layer and the core pipe. The aluminum layer both facilitates the detaching of the outer layer (in contrast to known plastic aluminum laminates) and functions as a barrier layer. In practice, a thin (0.1–0.3 mm) aluminum layer is formed on the outer layer of the core pipe by adhesion or ultrasonic welding.

Figure 3:
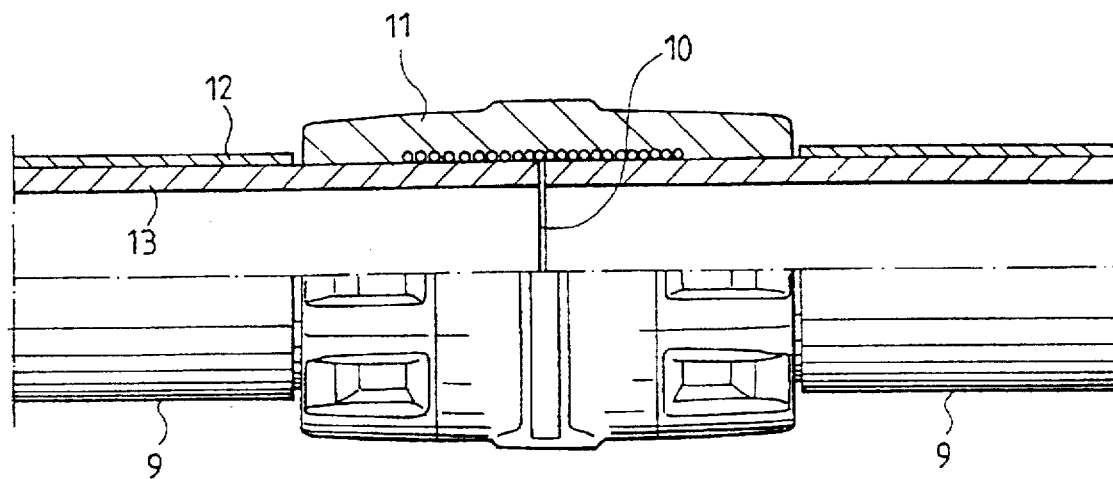
FIG. 3 shows partly in section two pipes according to the invention placed in a welding device.

A pipe according to the present invention is advantageously seamed by peeling the outer layer off at the area of the pipes to be seamed, and by subsequently placing the pipes to be seamed together, and by carrying out the seaming e.g. by electric welding. Thereafter the seam is protected where necessary with a layer similar to the outer layer, or left unprotected. In FIG. 3 is shown, by way of example, two identical pipes 9 according to the invention, which are placed with their ends positioned against each other at 10 in an electrofusion pipe coupler device 11. The outer layers 12 of the pipes has been removed from the cores 13 at the ends of the pipes 9, in order to facilitate proper insertion and welding of the pipes.

It is obvious to one skilled in the art that the embodiments of the invention are not limited to those described above, but that they may vary within the scope of the attached claims.

We claim:

1. A method of forming a two-layer plastic pipe to be laid in the ground for conducting material therethrough, the method comprising the step of:

forming a core pipe (2) consisting essentially of a first plastic material substantially free from colouring and stabilizing agents;

forming a detachable outer hose (3;7) of a second plastic material around said core pipe (2) by a suitable coating method and including in said second plastic material an amount of additives effective to protect said core pipe with said outer hose from stresses and loads of laying said core pipe and outer hose and usage thereof in ground; and providing a release layer between said core pipe and said outer hose for making said outer hose more easily detachable from said core pipe than without said release layer.

2. In a method of forming a two-layer plastic pipe laid in the ground for conducting material therethrough, the improvement of the method comprising the step of:

forming a core pipe (2) consisting essentially of a first plastic material;

forming a detachable outer hose (3;7) of a second plastic material around said core pipe (2) by a suitable coating method and including only in said second plastic material an amount of additives effective to protect said core pipe with said outer hose from stresses and loads of laying said core pipe and outer hose and usage thereof in ground; and providing a release layer between said core pipe and said outer hose for making said outer hose more easily detachable from said core pipe than without said release layer.

3. A method according to claim 1, wherein said release layer between the core pipe and the outer hose (3) comprises a layer of wax.

4. A method according to claim 1, wherein said release layer between the core pipe and the outer hose (3) comprises a thin aluminum layer.

5. A method according to claim 1, wherein the plastic material of said outer hose is formed on the core pipe in a non-adherent state to render it easily detachable from the core pipe.

6. A method according to claim 5, wherein said non-adherent state of the outer hose is achieved by adding wax as a release agent to the plastic material of the outer hose (3).

7. A method according to claim 5, wherein said non-adherent state of the outer hose is achieved by adding chalk as a release agent to the plastic material of the outer hose (3).

8. A method according to claim 5, wherein said non-adherent state of the outer hose is achieved by adding talc as a release agent to the plastic material of the outer hose (3).

9. A method according to claim 5, wherein said non-adherent state of the outer hose is achieved by cooling the plastic material of the outer hose (3) before forming it on the core pipe.

10. A method according to claim 1, wherein the outer hose (3) is provided around the core pipe (2) by coextrusion.

11. A method according to claim 1, comprising the step of mixing flake-like mica with the plastic material of the outer hose (3).

12. A method according to claim 1, comprising the step of mixing reinforced fibres with the plastic material of the outer hose (3).

13. A method according to claim 1, comprising the step of forming flanges or corrugations (6) spaced from one another on the outer hose (7).

14. A method according to claim 1, comprising the step of foaming the plastic material of the outer hose (3).

15. A method according to claim 1, comprising the step of crosslinking the plastic material of the outer hose (3).

16. A method according to claim 1, comprising the step of mixing identifying dyes and UV stabilizing agents with the plastic material of the outer hose (3).

* * * * *